Figure 1:
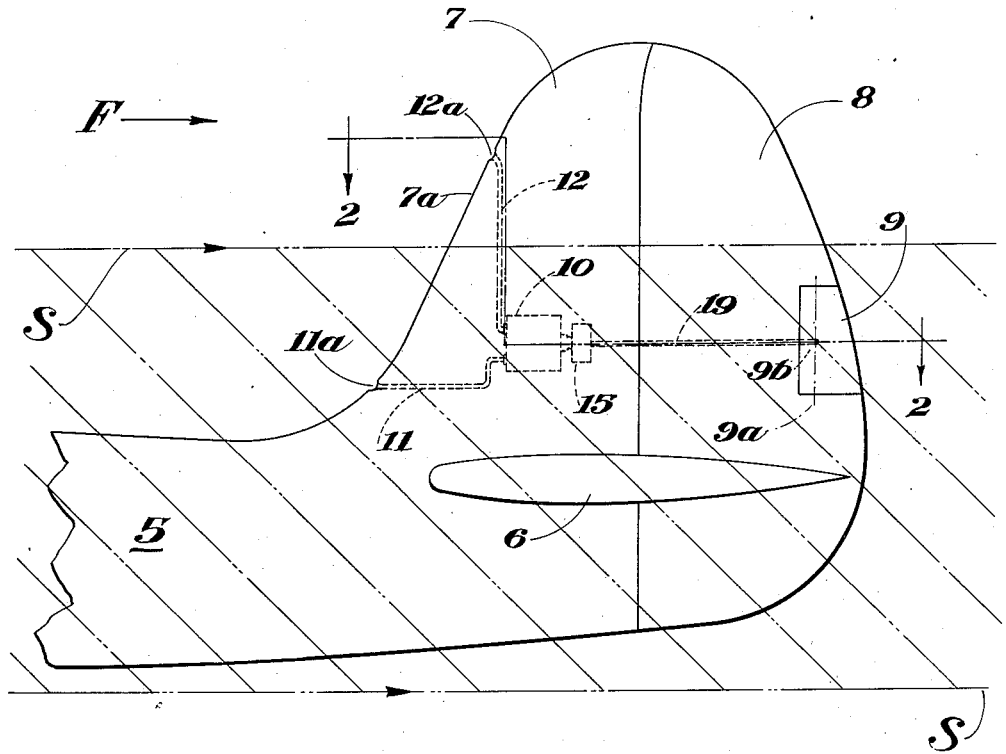

Dec. 27, 1949    R. C. WING    2,492,252
AUTOMATIC CONTROL FOR AIRCRAFT
Filed March 10, 1945

INVENTOR.
ROBERT C. WING
BY
HIS ATTORNEY

Patented Dec. 27, 1949

2,492,252

UNITED STATES PATENT OFFICE 2,492,252

AUTOMATIC CONTROL FOR AIRCRAFT

Robert C. Wing, Columbus, Ohio, assignor to Curtiss-Wright Corporation, a corporation of Delaware Application March 10, 1945, Serial No. 582,022

7 Claims. (Cl. 244—78)

The present invention relates to the automatic operation of auxiliary and associated control surfaces and more particularly to improvements in automatic balance tabs for the compensation of power changes in aircraft.

In recent years the use of tabs on large heavy aircraft, as well as smaller highly powered airplanes, has become quite common. These tabs usually take the form of relatively small surfaces inset at the trailing edge of the normal control surface such as an aileron, elevator or rudder. They are usually arranged for separate automatic or manual actuation with respect to the control surface with which they are associated and normally form a continuous part thereof in the neutral position. Such tabs are usually either of the balance, or trim, type or they may be of the servo type in which they assist the pilot or other initiating force in overcoming the large pilot forces which would otherwise be required to move the control surface to the desired degree. The present invention relates essentially to the balance or trim type tab as more particularly applied to an aircraft rudder for the automatic compensation of changes in power plant output, although it is also applicable to other control surfaces and conditions.

The recent trend towards low power loadings, that is the reduction in the ratio of the gross weight of an airplane to the increased output of its power plant, has greatly intensified the problem of maintaining adequate and reasonable control force changes to compensate for or trim the moments which are introduced by large power changes. From both actual flight and wind tunnel tests of a modern low wing monoplane of relatively low power loading, it has been found that there is critical need for adequate and rapid rudder trim particularly as the result of power changes in going from high speed level flight to high power landing approach. Prior efforts to provide a solution to this problem included the use of manually operated trim tabs, but these were invariably found to be too slow in response, their use was not convenient and in addition to their increasing the already manifold duties the pilot is required to perform in making a landing, they have been found disadvantageous and objectionable.

The present invention eliminates the slow and inconvenient manual operation of the trim tab by the provision of a piston-actuated tab which is automatically operated by differentials in pressure induced by the slipstream and the free airstream on opposite sides of the piston. As more particularly applied to a rudder tab, the present invention includes the provision of a cylinder housing a differential piston preferably positioned within the vertical fin and connected by pressure leads to the leading edge of the fin, one within and the other outside of the propeller slipstream. The piston is connected by an actuating linkage to the control horn of the rudder tab in such manner that the latter is automatically actuated to compensate for power changes which otherwise impose adverse yawing moments upon the airplane.

It is accordingly a primary object of the present invention to provide a balance tab arrangement which automatically compensates for changes in the power output of an airplane engine. It is a further and corollary object to provide an automatically actuated rudder trim tab to relieve the pilot of additional duties, particularly in the landing of low power-loaded aircraft. A further object of this invention resides in the utilization of the dynamic impact pressure differentials between free airstream and slipstream as the effective force for automatically actuating the tab for all combinations of power and speed of the aircraft.

Figure 2:
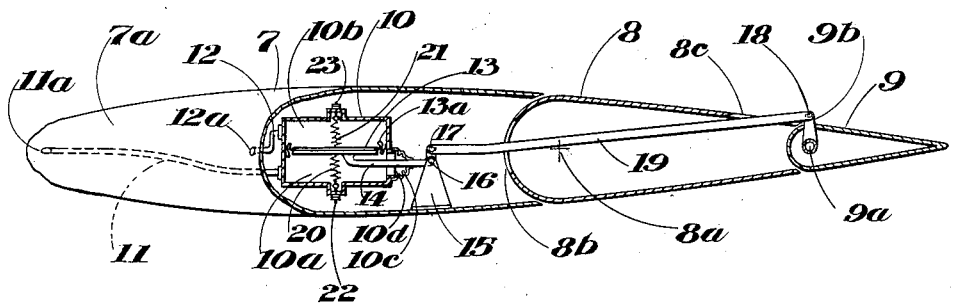

Other objects and advantages of the present invention will become apparent to those skilled in the art after reading the following description taken with the accompanying drawings, forming a part hereof, in which:

Fig. 1 is a side elevational view of the empennage of an airplane embodying the present invention; and Fig. 2 is an enlarged sectional plan view of the vertical surfaces of Fig. 1 taken along the lines 2—2 thereof to indicate an automatic trim tab mechanism housed therein.

Referring now to Fig. 1, the numeral 5 indicates the empennage or rear portion of the fuselage of an airplane provided with the usual horizontal tail surfaces 6, normally comprising a fixed horizontal stabilizer and elevator surfaces controllably mounted thereon, a vertical tail group consisting of the fixed vertical stabilizer 7 and a rudder control surface 8 movably mounted thereupon. The airplane is provided with a conventional power plant and propeller (not shown) and which for the purposes of this description presumes the use of a propeller having clockwise rotation as viewed from the rear of the airplane. The airplane is preferably provided also with conventional pilot controls and the usual rudder pedals (not shown) would be operatively connected for the manual control of the rudder 8.

A balance or trim tab 9 is inset from and aligned with the trailing edge of the rudder 8, being pivotally mounted upon the hinge 9a for relative movements with respect to the rudder. The rudder 8 in turn may be hingedly mounted in the usual manner at 8a upon the fixed fin 7 and is provided with openings through its leading edge and side surfaces at 8b and 8c, respectively, for the tab actuating mechanism to be more fully described below.

Referring now to both Figs. 1 and 2, there is provided within the fixed vertical stabilizer 7 a pressure differential casing or cylinder 10 to which is connected a pressure conduit or lead 11 terminating in an opening 11a at the leading edge 7a of the fin adjacent its lower portion where it flows into the under surface of the fuselage 5. The interior of the cylinder 10 is also in communication, through a low pressure conduit 12, with an opening 12a at the leading edge of the fin at a point well above the opening 11a toward the tip or upper portion of the vertical surface 7.

The interior of the casing or cylinder 10 is divided by a piston 13 into high and low pressure portions 10a and 10b, respectively, these portions being in communication through the pressure leads 11 and 12, with the orifices 11a and 12a. In Fig. 1 there has been indicated in diagonal construction lines by the letter S, the propeller slipstream which flows over the portion of the tail surfaces covered by the diagonal lines as the airplane moves forward in flight from right to left. The region of free air above and outside the propeller slipstream is indicated as the free airstream F and the pressure due to the relative movement between this free air and the upper portion of the vertical surfaces will be referred to as that induced by the free airstream. It will be noted that the inlet opening 11a is disposed within and is addressed to the slipstream S; it will therefore be subjected under certain power plant conditions to higher pressures than the opening 12a disposed outside the slipstream and addressed to the free airstream.

The piston 13 is movably supported within the cylinder 10 on the bellcrank lever 14 which is pivotally supported from the fixed fin structure by the bracket 15 in the region of its angularly offset arms by the pivot 16. The cylinder 10 is also fixedly supported from the fin structure and an annular seal 13a of flexible material is attached between the periphery of the piston and the inner wall of the cylinder to maintain the pressures induced within the chambers 10a and 10b in all positions of the piston. A seal or glove 10c of similar flexible material embraces the lever 14 where it passes through the slotted opening 10d in order to prevent loss of pressures built up in the chamber 10a. The terminal of the shorter lever of the bellcrank 14 is pivotally connected at 17 to the push-pull rod 19 which extends rearward through the openings 8b and 8c at the leading edge and side surface, respectively, of the rudder 8. The aft terminal of the rod 19 is pivotally connected at the pivot 18 to the laterally extending horn or lever 9b attached to the pivoted torque shaft 9a of the tab 9.

Each surface of the piston 13 is connected by means of opposed tension springs 20 and 21 to the opposite ends of the cylinder 10. These springs are attached by threadedly adjustable eye-bolts 22 and 23 whereby the respective springs may be suitably tensioned to cause the piston to remain in its central or neutral position both when the airplane is flown at high speed in normal horizontal flight, during take-off or when taxiing at speeds below which the pressure centering of the piston 13 would be ineffective. In normal high speed level flight the slipstream to free stream velocity ratio is approximately 1.0, that is, the velocities are substantially the same. Accordingly when the airplane is flown under these conditions the pressures developed within the chambers 10a and 10b are substantially equal and the pressure differential on opposite sides of the piston is zero. There is therefore no force tending to rotate the bellcrank lever 14 or the tab 9, which, with the aid of the centering springs 20 and 21, remains in its neutral position, aligned with the rudder surface.

Should the airplane now proceed into a high powered landing attitude, the slipstream to free stream velocity ratio increases to values from 1.5 to 2.5, depending upon the particular combination of power plant, propeller and airplane stalling speed. A differential in pressure is accordingly developed across the piston 13 with the higher pressure in chamber 10a and the lower pressure in 10b. This difference in pressure is of sufficient magnitude to overcome the centralizing effect of the springs 20 and 21, causing the piston to move toward the lower pressure chamber 10b, and the bellcrank lever 14 to rotate clockwise, resulting in clockwise rotation of the tab 9 as viewed in the plan view of Fig. 2. This clockwise movement of the tab has the effect of rotating the rudder 8 in the opposite or counterclockwise direction, as viewed in Fig. 2 thereby creating a correcting yawing movement about the center of gravity of the airplane in a clockwise direction. As indicated above the described arrangement and operation is predicated upon a clockwise rotation of the propeller as viewed from the rear and in the event a counterclockwise rotating propeller were substituted it would be necessary to rotate the tab crank 9b through 180 degrees to obtain the correct operation.

From wind tunnel tests of a modern low wing monoplane, in which it was found that the most critical condition for rudder trim after power change results in going from high speed in level flight to high power landing approach, it was determined that a piston area of approximately 25 square inches provided adequate force for the automatic operation of the rudder tab. This was based upon a tab bellcrank link of two inches and a mechanical disadvantage of one to three in an airplane in which the slipstream velocity was 1.9 times the free stream velocity in the high powered landing approach condition. Inasmuch as the actuating pressure increment is between free stream and slipstream, and is not simply a function of the throttle setting, the power compensation available to trim is effective for all combinations of power and speed. In the same airplane, it was determined that a spring load magnitude acting upon the piston or other portions of the linkage system was approximately of an order to develop ten inch pounds of centering moment at the tab hinge 9a.

The above values are given as examples only and it will be appreciated that they will vary with the size, the power of the propulsion unit, stalling speed and other characteristics of the particular airplane and may be suitably determined as the result of either wind tunnel or flight test research. The correct location of the pressure tubes on the fin leading edge and the variation of pressures with yaw would also preferably be determined in the wind tunnel for the particular model on which the invention would be incorporated. The degree of linearity of pressure change with variations of power and velocity would preferably be similarly determined to obtain the most uniform trim compensating operation.

It will accordingly be noted that a fully automatic power change compensating balance tab is derived by the provision of the enclosed arrangement which operates smoothly and concurrently with the change in the velocity ratio between slipstream and free airstream and thereby relieves the pilot of an additional burden during landing operations when his whole attention is required with other considerations. It will also be obvious to those skilled in the art, that while in the preferred embodiment of the present invention which has been illustrated in the drawings, the orifices or air heads are disposed in the leading edge of the vertical tail group, they could be also disposed in other portions of the airplane either by openings through the surface thereof, or at the ends of projecting tubes after the manner of the well-known Pitot-static tubes for airspeed indication. Such considerations as the possibility of icing of the leading edge of a fixed fin, or the interference of the orifices with de-icing shoes would, of course, necessitate obvious variations of the invention from the arrangement as it has been shown. Under certain conditions, it might be desirable that the orifices be installed in the forward portion of the airplane in the wake of the propulsion unit and also that the cylinder and actuating piston may operate directly upon a pilot or servo-tab control in the region of the airplane cockpit.

These and other forms and modifications of the instant invention, both with respect to its general arrangement and the details of its respective parts, which may occur to those skilled in the art after reading the present description, are all intended to fall within the scope and spirit of this invention as more particularly set forth in the appended claims.

I claim:

1. In an airplane including a forwardly disposed power plant, a propeller driven by said power plant, a fixed vertical fin partially disposed within the slipstream of said propeller, a rudder surface movably carried upon said fixed fin and a balance tab pivotally mounted upon said rudder surface, means for automatically adjusting said balance tab to correct for changes in the output of said power plant comprising a differential pressure piston and cylinder assembly, a pair of pressure chambers in said cylinder, a first chamber communicating with the leading edge portion of said fixed fin disposed within and the other chamber communicating with the leading edge portion disposed outside said slipstream and operating means interconnecting said piston with said balance tab.

2. An automatic control system for an airplane including a fuselage, a power plant, a propeller driven by said power plant, a vertical tail group partially disposed within the slipstream of said propeller, said tail group supported upon the aft portion of said fuselage and including a vertical stabilizer, a rudder surface pivotally carried upon said stabilizer and a balance tab pivotally mounted upon said rudder surface, a cylinder housed within said airplane, a piston mounted for movement within said cylinder and dividing said cylinder into pressure chambers, communication means extending between a first of said chambers and the leading edge portion of said stabilizer within said propeller slipstream, second communication means extending between said second chamber and the leading edge portion of said stabilizer disposed outside said propeller slipstream, and operating means extending between said piston and said balance tab whereby power output changes in said power plant create differentials in pressure between said pressure chambers of said cylinder and initiate compensating movements of said tab and rudder surface.

3. In an airplane subjected to yaw resulting from variations in power plant thrust, a stabilizer surface having a first pressure-sensitive inlet within and a second pressure-sensitive inlet outside the power plant slipstream, a rudder surface movably mounted upon said stabilizer surface for the control of yaw, a balance tab movably carried by said rudder surface for supplementing said yaw control, a pressure differential actuator operatively connected to said balance tab, and communicating means for transmitting the respective air pressures from said pressure-sensitive inlets to the respective opposite sides of said pressure differential actuator for the automatic compensating movement of said balance tab.

4. In an airplane having a propulsion unit, said airplane subjected to yawing moments upon changes in the thrust of said propulsion unit, an empennage including a fixed vertical fin, a first pressure inlet on said fin addressed to the slipstream of said propulsion unit, a second pressure inlet disposed on said fin outside of said slipstream, a rudder movably mounted upon said fin, a control tab movably mounted upon said rudder, and piston-cylinder actuating means having one side in communication with said first pressure inlet and a second side in communication with said second pressure inlet, said piston-cylinder actuating means operatively connected to said control tab and arranged such that said actuating means is initiated by pressure differentials between said inlets for the automatic adjustment of said control tab and said rudder to compensate for said yawing tendencies.

5. An airplane having a propulsion unit, a fixed fin, a rudder hingedly mounted upon said fin, a balance tab hingedly mounted upon said rudder, said fixed fin having a portion addressed to the slipstream from said propulsion unit and another portion disposed outside said slipstream addressed to the free airstream, first and second pressure inlet conduits each open to the air pressure at its said respective fin portion, actuating means having one side in communication with the first pressure inlet conduit and a second side in communication with the second said pressure inlet conduit, and means interconnecting said actuating means with said balance tab whereby movement of said actuating means is initiated by the pressure differentials within said pressure conduits for the automatic compensating movement of said balance tab upon changes in the air pressure differences resulting from the variations in the output of said propulsion unit.

6. In an aircraft having an auxiliary surface for the control of yaw, a forwardly disposed engine, a propeller driven by said engine, a fixed fin upon which said auxiliary surface is pivotally mounted, said fin being partially disposed within the slipstream of said propeller, fluid inlet means on the leading edge of said fin spaced in such manner that but one inlet is exposed to said propeller slipstream and the remaining fluid inlet exposed to the free airstream, and fluid motor means operatively connected to said auxiliary surface, said fluid motor means having one side connected to said first fluid inlet and a second side connected to said remaining fluid inlet, said fluid motor means actuated by the pressure differential between the portion of the said fixed fin disposed within the propeller slipstream and the portion of the said fixed fin exposed to said free airstream as transmitted through said fluid inlet means for the movement of said auxiliary surface to correct for yawing moments created by changes in said engine output.

7. The combination with an aircraft, of a fixed fin having spaced fluid inlets in its leading edge, a control surface movably mounted on said fixed fin, thrust imparting means for the propulsion of the aircraft adapted to produce a slipstream which sweeps a portion only of the leading edge of said fixed fin including but one of said fluid inlets, aerodynamic means movably carried upon said control surface adapted to initiate movement of said control surface to compensate for undesired movement of said aircraft caused by variations in said thrust imparting means, fluid motor means operatively connected to said aerodynamic means, and conduit means interconnecting one side of said fluid motor means with a first fluid inlet and a second side of said fluid motor means with the second of said fluid inlets whereby movements of said fluid motor means are initiated by the pressure differentials at said fixed fin leading edge between said slipstream and the surrounding airstream as transmitted by said conduit means for automatically positioning said aerodynamic means for adjustment of said control surface to compensate for undesired movement of the aircraft resulting from variations in said thrust imparting means.

ROBERT C. WING.

REFERENCES CITED

The following references are of record in the file of this patent:

UNITED STATES PATENTS

| Number | Name | Date |
|---|---|---|
| 1,972,336 | Gardner | Apr. 10, 1930 |
| 2,057,877 | Bragunier | Mar. 19, 1935 |
| 2,156,976 | Fischel | Dec. 7, 1937 |
| 2,167,533 | Solomon | Aug. 25, 1938 |

FOREIGN PATENTS

| Number | Country | Date |
|---|---|---|
| 622,991 | Germany | Jan. 10, 1935 |